(12) United States Patent
Miller et al.

(10) Patent No.: US 7,389,506 B1
(45) Date of Patent: Jun. 17, 2008

(54) SELECTING PROCESSOR CONFIGURATION BASED ON THREAD USAGE IN A MULTIPROCESSOR SYSTEM

(75) Inventors: Matthew Miller, Rancho Santa Margarita, CA (US); Robert Len Walker, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 714 days.

(21) Appl. No.: 10/334,369

(22) Filed: Dec. 30, 2002

Related U.S. Application Data

(63) Continuation-in-part of application No. 10/209,454, filed on Jul. 30, 2002, now Pat. No. 7,093,258.

(51) Int. Cl.
*G06F 9/455* (2006.01)

(52) U.S. Cl. ............................................. 718/1; 718/105

(58) Field of Classification Search .................. 718/1, 718/105; 712/13–14
See application file for complete search history.

(56) References Cited

U.S. PATENT DOCUMENTS

| | | | | |
|---|---|---|---|---|
| 5,692,192 A | * | 11/1997 | Sudo ........................... | 718/105 |
| 5,692,193 A | * | 11/1997 | Jagannathan et al. ......... | 718/106 |
| 6,105,053 A | * | 8/2000 | Kimmel et al. .............. | 718/105 |
| 6,289,369 B1 | * | 9/2001 | Sundaresan .................. | 718/103 |
| 6,901,522 B2 | * | 5/2005 | Buch ........................... | 713/320 |
| 2002/0038301 A1 | * | 3/2002 | Aridor et al. .................. | 707/10 |
| 2002/0099756 A1 | * | 7/2002 | Catthoor et al. ............. | 709/102 |
| 2002/0099759 A1 | * | 7/2002 | Gootherts .................... | 709/105 |

* cited by examiner

*Primary Examiner*—Meng-Ai An
*Assistant Examiner*—Phuong N Hoang
(74) *Attorney, Agent, or Firm*—Phuong-Quan Hoang; Robert P. Marley; Richard J. Gregson

(57) ABSTRACT

An embodiment of the invention is a technique to affinitize a thread in a multiprocessor system having N clusters of processors. A usage status of an active thread in the multiprocessor system is determined. The active thread utilize one of first and second local memories associated with first and second processor configurations, respectively. One of the first and second processor configurations is selected based on the usage status.

54 Claims, 7 Drawing Sheets

SELECTING PROCESSOR CONFIGURATION BASED ON THREAD USAGE IN A MULTIPROCESSOR SYSTEM

CROSS-REFERENCE TO RELATED APPLICATIONS

This application is a continuation-in-part of the application Ser. No. 10/209,454 entitled "Method And System For Managing Distribution Of Computer-Executable Program Threads Between Central Processing Units In A Multi-Central Processing Unit Computer System", filed on Jul. 30, 2002, issued as U.S. Pat. No. 7,093,258 on Aug. 15, 2006 and assigned to the same assignee. This application is related to the following patent applications: Ser. No. 10/334,368 entitled "AFFINITIZING THREADS IN A MULTIPROCESSOR SYSTEM", issued as U.S. Pat. No. 7,287,254 on Oct. 23, 2007; Ser. No. 10/334,341 entitled "DYNAMICALLY GENERATING MASKS FOR THREAD SCHEDULING IN A MULTIPROCESSOR SYSTEM", issued as U.S. Pat. No. 7,275,249 on Sep. 25, 2007, all filed on the same date and assigned to the same assignee as the present application, the contents of each of which are herein incorporated by reference.

BACKGROUND

1. Field of the Invention

Embodiments of the invention relates to the field of operating systems, and more specifically, to thread management.

2. Description of Related Art

Multithreading technologies have become popular in multiprocessor systems to support various levels of parallelism, to enable dynamic load balancing, to support virtual processors, and to enhance system performance. One of the challenges in designing an efficient multithreaded multiprocessor system is thread scheduling.

The performance of a multithreaded multiprocessor system depends on a number of factors such as local memory utilization, thread communication, and load balancing. Existing techniques typically treat threads equally without discriminating their usage. These techniques have a number of disadvantages. First, a thread that flushes its local caches frequently may cause unbalanced cache usage for other threads, resulting in poor performance. Second, a thread having an extensive cache usage may use up memory space of other threads, causing frequent cache updates, thread migration, and thread communication. Third, a system thread performing system-level functions may interfere or be interfered by application threads. These frequent activities tend to degrade system performance.

SUMMARY OF INVENTION

An embodiment of the invention is a technique to affinitize a thread in a multiprocessor system having N clusters of processors. A usage status of an active thread in the multiprocessor system is determined. The active thread utilize one of first and second local memories associated with first and second processor configurations, respectively. One of the first and second processor configurations is selected based on the usage status.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the invention is a technique to affinitize a thread in a multiprocessor system having N clusters of processors. A usage status of an active thread in the multiprocessor system is determined. The active thread utilize one of first and second local memories associated with first and second processor configurations, respectively. One of the first and second processor configurations is selected based on the usage status.

In the following description, numerous specific details are set forth. However, it is understood that embodiments of the invention may be practiced without these specific details. In other instances, well-known circuits, structures, and techniques have not been shown in order not to obscure the understanding of this description.

Figure 1A:
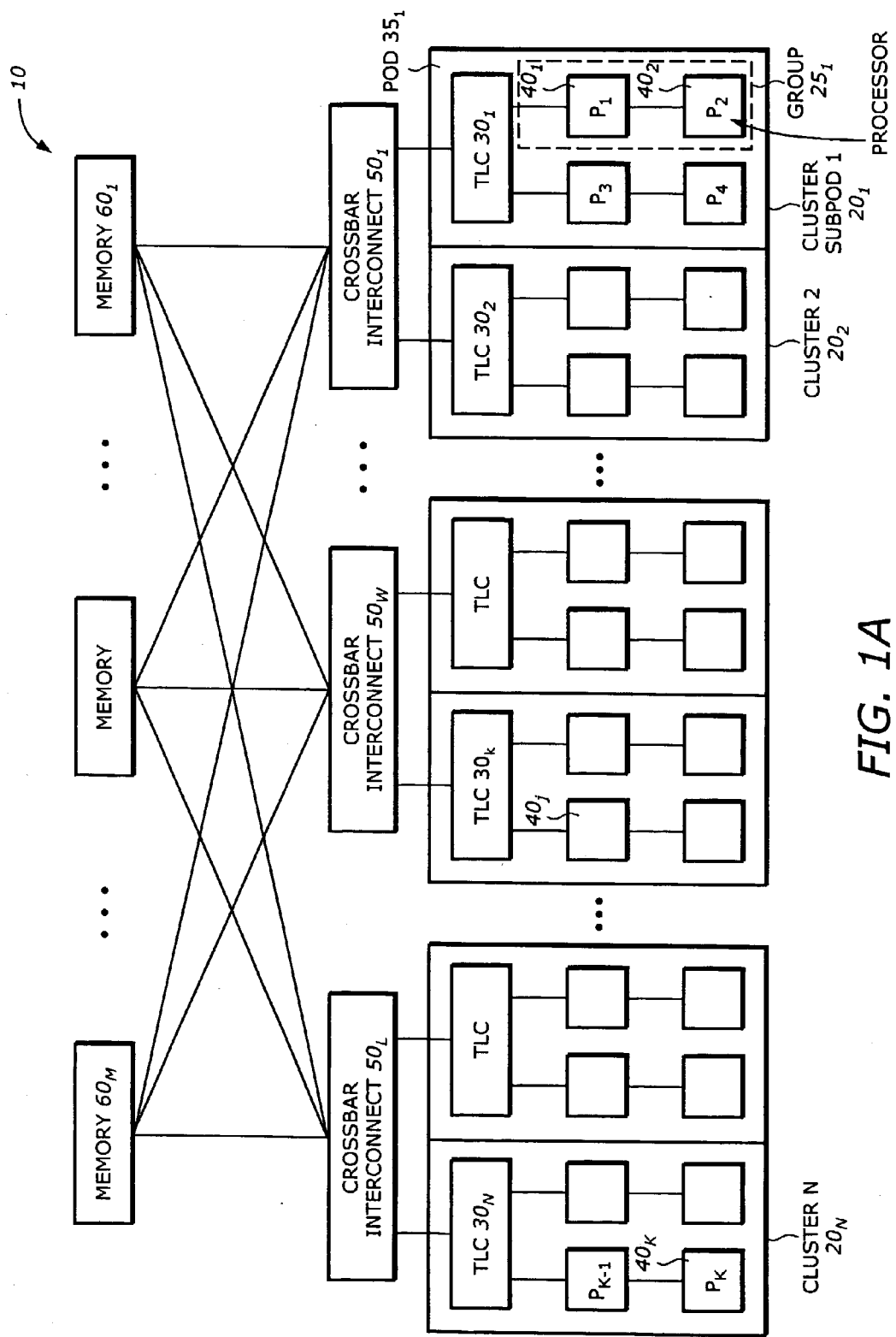
FIG. 1A is a diagram illustrating a system in which one embodiment of the invention can be practiced.

FIG. 1A is a diagram illustrating a system 10 in which one embodiment of the invention can be practiced. The system 10 includes N clusters of processors $20_1$ to $20_N$, L crossbar interconnects $50_1$ to $50_L$ and M memories $60_1$ to $60_M$. The system 10 is referred to as a cellular multiprocessor (CMP) system.

Each of the clusters of processors $20_1$ to $20_N$ forms a subpod and includes a number of processor subsystems $40_j$'s and a third level cache (TLC) $30_k$'s. The processor subsystems $40_j$'s within each cluster $20_i$ further form into groups connected together via a bus structure. Each group is connected to a TLC $30_k$. For example, processor subsystems $40_1$ and $40_2$ form a group $25_1$. It is contemplated that the number of processor subsystems $40_j$'s in a group and the number of groups in a cluster may be any suitable number according to the configuration. As illustrated in FIG. 1A, the processor subsystems $40_j$'s form into two groups and each group consists of two processor subsystems. Each of the TLC $30_k$'s provides another level of cache memory in addition to the second level (L2) and first level (L1) caches in each of the processor subsystems $40_j$'s. Each of the TLC $30_k$'s provides a larger cache memory than the L2 and L1 caches of the corresponding processor subsystems to improve performance by allowing the processors within a subpod or group to share cached information. The TLC $30_k$'s may be implemented by any suitable memory technologies, including static random access memory (SRAM) and dynamic random access memory (DRAM). It is contemplated that a cache coherence protocol is maintained throughout the system 10.

Each of the crossbar interconnects $50_1$ to $50_L$ is a crossbar switch connected to the memories $60_1$ to $60_M$ and a number of clusters of processors. The clusters of processors that are connected to each crossbar interconnect form a pod. For example, the subpods or clusters $20_1$ and $20_2$ form a pod $35_1$. The crossbar interconnect $50_m$'s fully connects any one of memories $60_1$ to $60_M$ to any one of the clusters of processors in the pod that it is connected to. Each of the memories $60_1$ to $60_M$ is accessible to any of the processor subsystems $40_j$'s via the crossbar interconnects $50_m$'s. The memories may be implemented by any suitable memory technologies including SRAM and DRAM.

The configuration of the CMP system 10 provides a flexible mechanism for thread scheduling and thread affinity management. A thread is a unit of program or code. A thread may be created by an application, a virtual machine, or the operating system. Thread affinitization is a process to assign a thread to a processor or a cluster of processors. When a thread is affinitized to a cluster of processors, it is executed within the processors in that cluster. Thread affinitization is a main task in thread scheduling. The thread affinity granularity refers to the degree of clustering of the processor subsystem $40_j$'s in thread affinity management. The granularity may be at the processor level, at the bus level (e.g., two processors connected to the TLC via a bus), at the subpod level (e.g., four processors connected to the TLC), at the pod level (e.g., eight processors connected to a common crossbar switch), or at any number of processors. The thread granularity may be statically provided via user's input or dynamically changed according to the system behavior.

Figure 1B:
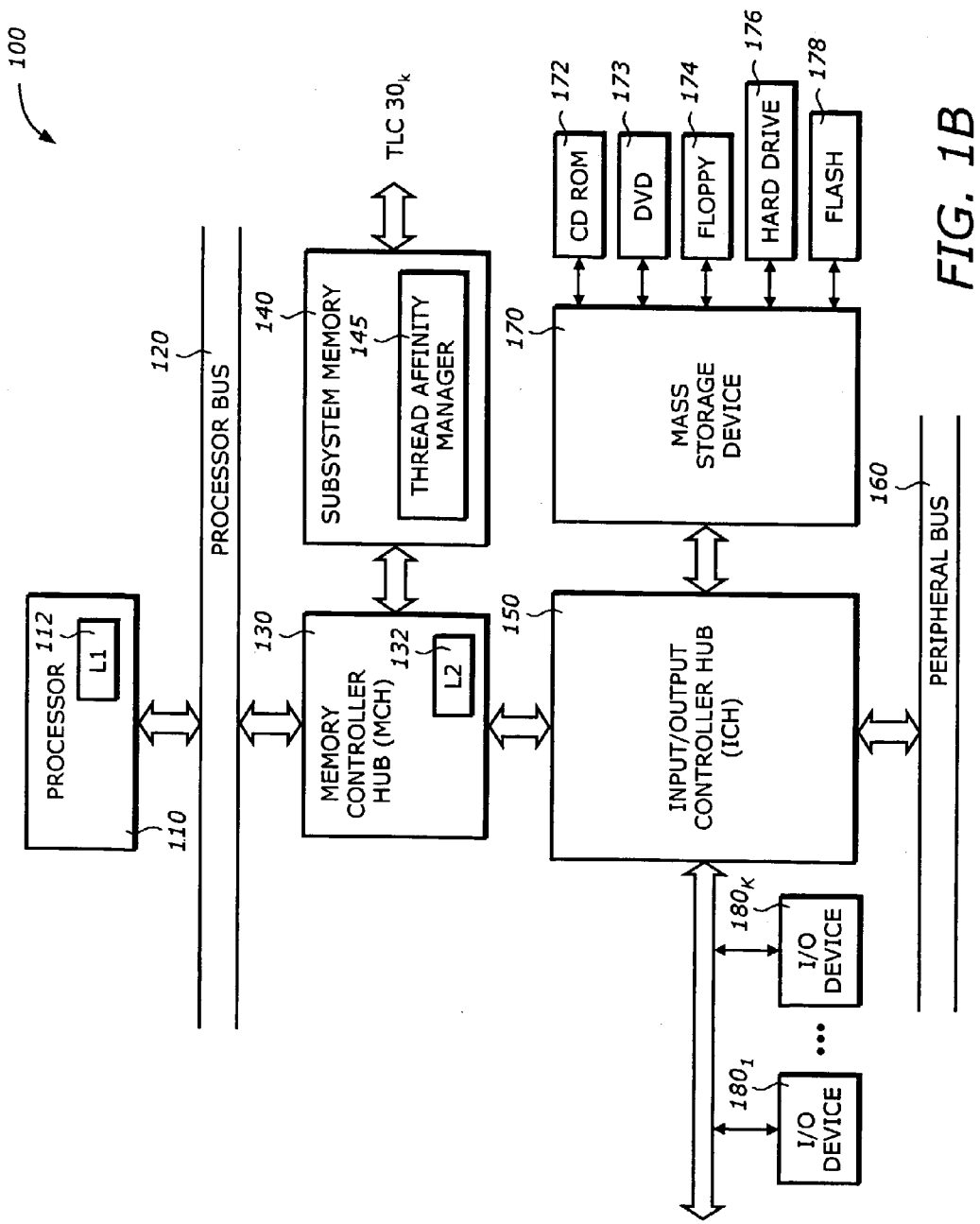
FIG. 1B is a diagram illustrating a processor subsystem according to one embodiment of the invention.

FIG. 1B is a diagram illustrating a processor subsystem 40 in which one embodiment of the invention can be practiced. The processor subsystem 40 includes a processor 110, a processor bus 120, a memory control hub (MCH) 130, a subsystem memory 140, an input/output control hub (ICH) 150, a peripheral bus 160, a mass storage device 170, and input/output devices $180_1$ to $180_K$. Note that the processor subsystem 40 may include more or less elements than these elements. The processor subsystem 40 may also be used to emulate or simulate the CMP using the thread affinity management technique described in the following.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. The processor 110 typically includes a first level (L1) cache 112.

The processor bus 120 provides interface signals to allow the processor 110 to communicate with other processors or devices, e.g., the MCH 130. The processor bus 120 may support a uni-processor or multiprocessor configuration. The processor bus 120 may be parallel, sequential, pipelined, asynchronous, synchronous, or any combination thereof.

The MCH 130 provides control and configuration of memory and input/output devices such as a second level cache (L2) 132, the system memory 140, the ICH 150, and the TLC $30_k$. The MCH 130 may be integrated into a chipset that integrates multiple functionalities such as the isolated execution mode, host-to-peripheral bus interface, memory control. The MCH 130 interfaces to the peripheral bus 160. For clarity, not all the peripheral buses are shown. It is contemplated that the subsystem 40 may also include peripheral buses such as Peripheral Component Interconnect (PCI), accelerated graphics port (AGP), Industry Standard Architecture (ISA) bus, and Universal Serial Bus (USB), etc.

The subsystem memory 140 stores system code and data. The subsystem memory 140 is typically implemented with dynamic random access memory (DRAM) or static random access memory (SRAM). The subsystem memory may include program code or code segments implementing one embodiment of the invention. The subsystem memory includes a thread affinity manager 145. Any one of the elements of the thread affinity manager 145 may be implemented by hardware, software, firmware, microcode, or any combination thereof. The subsystem memory 140 may also include other programs or data which are not shown, such as an operating system. The thread affinity manager 145 contains program code that, when executed by the processor 110, causes the processor 110 to perform operations as described below.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 160, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, a digital video/versatile disc (DVD) 173, floppy drive 174, hard drive 176, flash memory 178, and any other magnetic or optic storage devices. The mass storage device 170 provides a mechanism to read machine-accessible media. The machine-accessible media may contain computer readable program code to perform tasks as described in the following.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
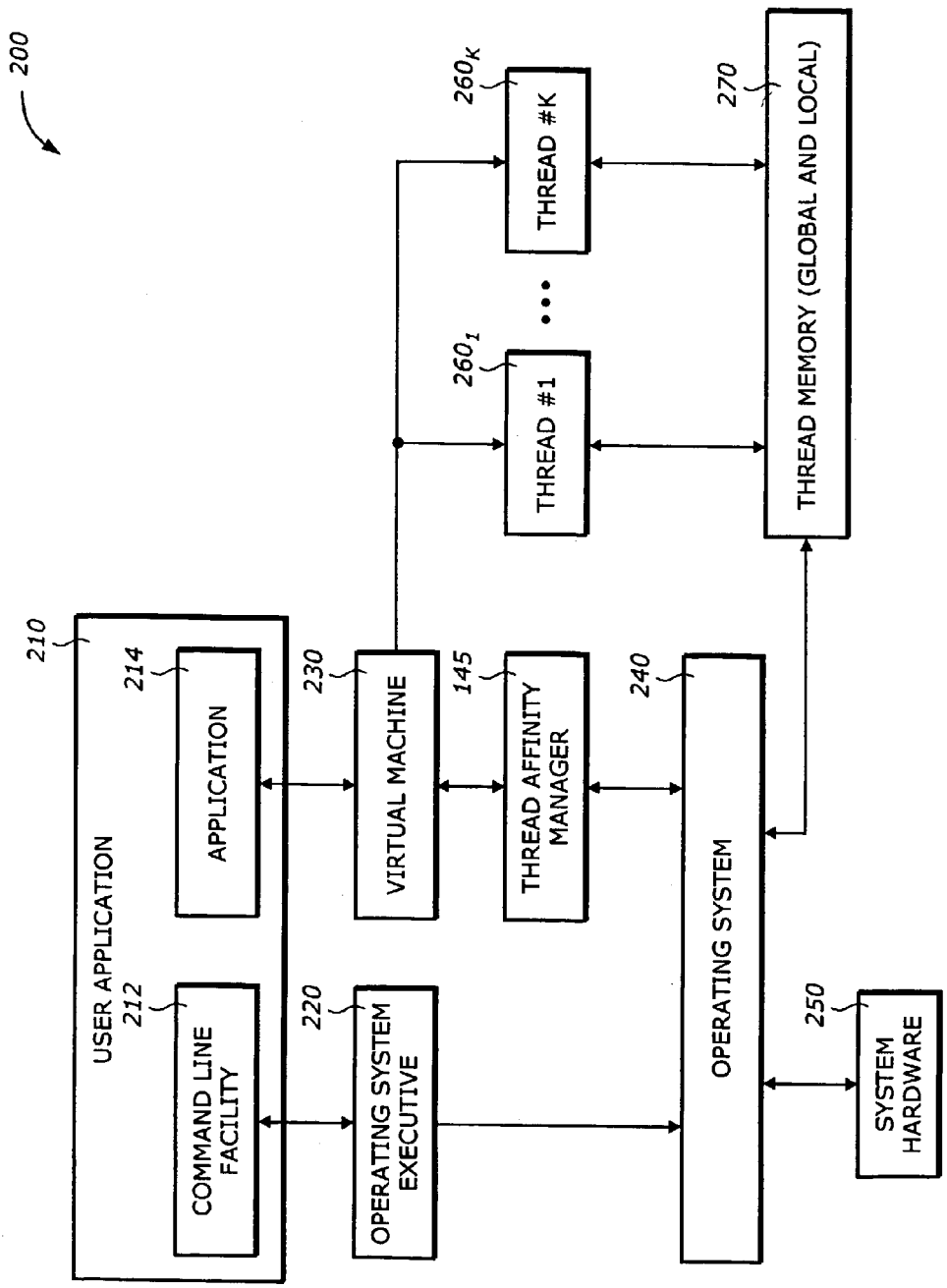
FIG. 2 is a diagram illustrating a software architecture according to one embodiment of the invention.

FIG. 2 is a diagram illustrating a software architecture 200 according to one embodiment of the invention. The software architecture 200 includes a user application 210, an operating system (OS) executive 220, a virtual machine 230, the thread affinity manager 145, an operating system 240, system hardware 250, K threads $260_1$ to $260_K$, and thread memory 270.

The user application 210 is a software layer that is interfaced to the user to allow the user to run, launch, and invoke applications. The user application 210 includes a command line facility 212 and an application 214. The command line facility 212 provides a mechanism to allow the user to control, manage, and configure a particular application program. The command line facility 212 may allow the user to request to launch, execute, or invoke the application 214 by issuing a command line. The command line facility 212 may include functional modules to facilitate command line editing, buffering, or manipulating. The command line may also include application parameters such as thread affinity management, count threshold, thread affinity granularity, argument list, etc. By using the command line facility 212, the user can have control over the thread affinity management such as setting thread affinity flag, selecting affinity granularity, and selecting the thread count threshold. The application 214 is a user program to perform particular tasks within the system 10. Examples of the application 214 may include a graphics program, a server interface program, a database program, or any program that may utilize the multiprocessor architecture provided by the system 10.

The OS executive 220 is a software component that interfaces to the command line facility 220 and the OS 240. The OS executive 220 may be a shell or a command interpreter that interprets the command line as generated by the command line facility 220 and passes the interpreted command line to the OS 240.

The virtual machine 230 provides an environment for executing the application 214. The virtual machine simulates the hardware platform on which the application is run. The virtual machine may include an interpreter, system calls, a library of functions, thread management functions, a garbage collector, and other interfaces. Examples of the virtual machine 230 include a parallel virtual machine (PVM), a Microsoft™ virtual machine, and a Java™ virtual machine (JVM).

The thread affinity manager 145 manages thread affinity via interfaces to the virtual machine 230 and the OS 240. The thread affinity manager 145 may perform the following tasks: creating an affinity mask, updating the affinity mask, selecting affinity granularity, thread scheduling, assigning threads to clusters of processors. One of the main functions of the thread affinity manager 145 is to select a cluster of processors to assign a thread to.

The OS 240 performs typical OS functions including process management, protection, scheduling, hardware interfacing, memory management, input/output management, etc. The OS 240 interacts with the system hardware 250 and the memory 270. The system hardware 250 may includes I/O devices, peripheral devices, peripheral controllers, network devices, memory elements, etc. In one embodiment, the OS 240 is one of a Windows™ OS, a Windows DataCenter™, a UNIX OS, a Linux OS, and any other suitable OS for multiprocessor systems.

The threads $260_1$ to $260_K$ are program threads created in user applications such as the application 214. The threads $210_1$ to $260_K$ may also include system threads or kernel threads that are created and run on behalf of the OS 240 or the virtual machine 230. Each of the threads $210_1$ to $260_K$ maintains its own local variables and local resources such as program counter and stack. They also share common global variables and memory. The threads interface to the thread memory 270 for accessing the local and global variables. The thread memory 270 may be any combination of the local caches, local memories, the associated TLC, and the global memories $60_1$ to $60_M$ shown in FIG. 1A.

An active thread is a thread that has been created to run in the application or in the virtual machine. For performance and efficiency, thread is affinitized or assigned to a cluster of processors according to the thread granularity. When a thread is affinitized to a cluster of processors, it shares with other threads most of the resources provided by that cluster of processor, including local memories such as third level cache (TLC). Such sharing within the same granularity level provides high performance because overhead in thread communication can be reduced significantly. In addition, thread migration is minimized, resulting in efficient load balancing and memory usage. It is, therefore, useful to discriminating clusters of processors on the basis of their mutual proximity, memory usage, interconnection structure, and other factors. This can be efficiently done by maintaining a set of granularity masks that reflect the processor configuration.

Figure 3:
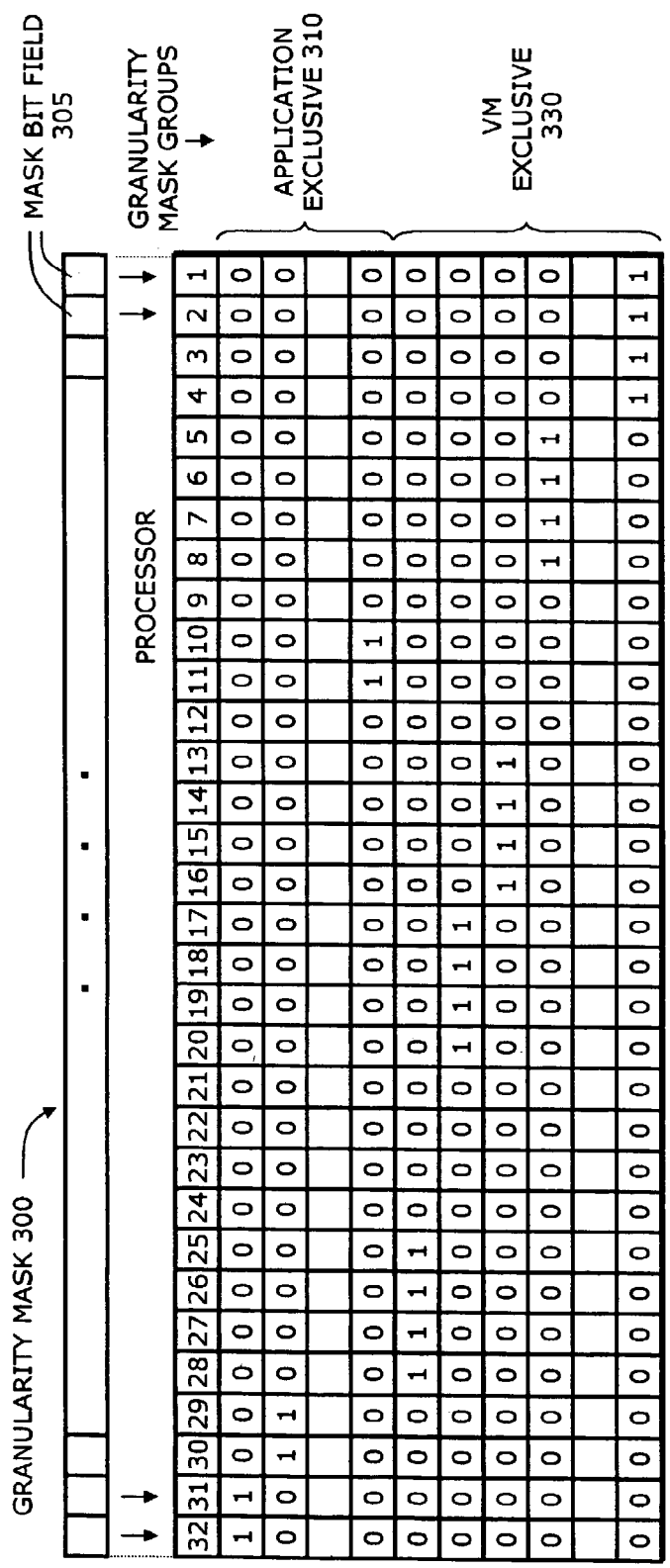
FIG. 3 is a diagram illustrating granularity masks according to one embodiment of the invention.

FIG. 3 is a diagram illustrating a granularity mask 300 according to one embodiment of the invention. The granularity mask 300 is a bit pattern that has been selected to correspond to processors selected for affinitization according to the thread granularity. As discussed above, the thread granularity is configurable to be one of a processor granularity, a bus granularity, a subpod granularity, and a pod granularity. Configurable thread granularity allows the locality of memory accesses to be utilized for maximum system performance. In general, in a system of N processors having a granularity of M processors, there are N/M different granularity masks.

The granularity mask 300 includes N granularity bit fields 305, where N is the number of processors in the system. Each bit field 305 has one bit to correspond to a processor. The bit positions are arranged according to the processor arrangement. As an example, in FIG. 3, there are 32 processors numbers 1 through 32. The state of each bit may be defined to indicate the availability of the corresponding processor. For example, it may indicate whether the corresponding processor is selected for affinitization. Alternatively, it may indicate whether the corresponding processor has been scheduled or affinitized to execute one or more threads. A bit is set to a logical ONE state if the corresponding processor is selected for affinitization and to a logical ZERO otherwise. As is known by one skilled in the art, the bit logical state may be the reverse, i.e., a logical ZERO indicates the corresponding processor is selected for affinitization, and logical ONE otherwise. The definition of the active level of the mask bit (e.g., logical ONE or ZERO) depends on the combining operator to merge the granularity mask with the current affinity mask in producing the new affinity mask. This combining operator may be any suitable logic function such as bitwise OR or AND operation. It is also contemplated that the granularity mask may have any other form or representation. For example, the granularity bit field 305 may have several bits to indicate several processor attributes such as affinitization selection, memory locality characteristics, preference usage (e.g., system tasks, application tasks), etc. Another representation may be a data structure with pointers to point to processor attribute blocks. As is know by one skilled in the art, appropriate application interfaces, drivers, or procedure calls to allow access to the granularity bit field 305 may be required for OS interfacing.

The granularity mask 300 may be divided into two granularity mask groups: an application exclusive group 310, and a VM exclusive group 330. The application exclusive group 310 includes granularity masks that are reserved exclusively for application threads. The VM exclusive group 330 includes granularity masks that are reserved exclusively for VM threads. This grouping of granularity masks may be determined in advance or may be dynamically created according to system configuration, run-time conditions, or system behavior. A thread may be an application thread in an application or an internal VM thread in a VM. An application thread may be affinitized to a cluster of processors corresponding to a granularity mask in the application exclusive group 310. A VM thread may be affinitized to a cluster of processors corresponding to a granularity mask in the VM exclusive group 330. The thread granularity for the application exclusive group 310 may be any one of a processor, bus, subpod or pod granularity. The thread granularity for the VM exclusive group 330 is at least subpod or larger so that shared resources, such as the TLC $30_i$ can be shared among the processors.

By discriminating a thread to be either an application thread or a VM thread and grouping the granularity masks into two types of masks, the thread can be affinitized to an appropriate cluster of processors for maximum memory localization. In addition, load balancing and thread communication can be performed efficiently. As will be discussed later, when a thread is ready for affinitization, its usage status can be queried and/or determined. Based on the usage status, the affinity manager 145 (shown in FIG. 1) can decide which group is most suitable for the thread, and within the selected group, which cluster of processors is most suitable.

The determination of which group to affinitize a thread to may be based on a number of factors. One factor is the usage status of the thread. The usage status indicates the status of the thread usage. This status may be static or dynamic depending on the nature of the thread and the system behavior and/or dynamics. In one embodiment, the status is static and fixed at the time the thread is created. The usage refers to how the thread is used. The usage may be based on the thread type. For example, a thread may be discriminated or classified as an application thread or a VM thread. An application thread may be further discriminated or classified as a memory intensive thread, an input/output intensive thread, or a processor intensive thread. Similarly, a VM thread may be further discriminated or classified as a memory intensive thread, an input/output intensive thread, or a processor intensive thread. Based on this usage, and coupled with information regarding the current state of the system, an appropriate processor configuration may be selected and the thread is then affinitized to a cluster of processors in the selected processor configuration.

Figure 4:
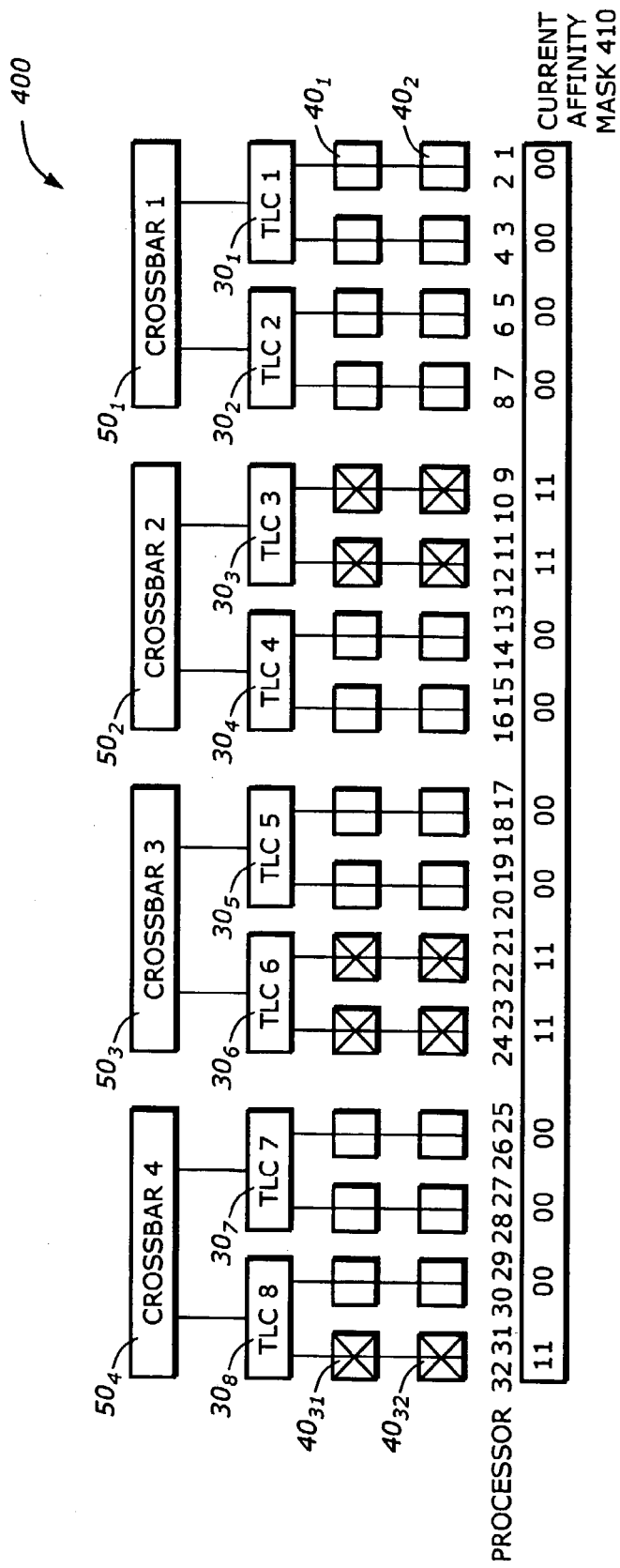
FIG. 4 is a diagram illustrating a processor configuration according to one embodiment of the invention.

FIG. 4 is a diagram illustrating a processor configuration 400 according to one embodiment of the invention. The processor configuration 400 shows which processors in the system are currently in use according to the affinity mask. As shown in FIG. 4, the processor configuration 400 corresponds to a current affinity mask 410 is 1100 0000 1111 0000 0000 1111 0000 0000. The current affinity mask 410 selects processors 9-10, 11-12, 21-22, 23-24, and 31-32 as shown with an X. These processors are selected for use by all the active threads in the system.

As discussed above, when an active thread is ready to be affinitized, its usage status is determined. The usage status can be queried or determined based on the task performed by the active thread. Depending on the usage status, the thread may be affinitized to a cluster of processors such that the resulting processor configuration provides the best performance. A number of factors are considered in deciding a particular processor configuration suitable for the active thread. Examples of these factors include memory locality, memory independence, thread communication, size of occupied memories, number of live objects, memory fragmentation, etc.

One particular important VM task is the garbage collection. Garbage collection (GC) is a process that automatically reclaims heap-allocated storage after its last usage by a program or application. Garbage collection tends to take up much processing time due to the effort to reclaim memory. An individually allocated data in the heap is referred to as an object, cell, or node. An object in the heap is called live, or reachable, if its address is held in a root, or pointed to by a pointer that is held in another live heap object. The root is a stable reference mechanism such as processor registers, stack, or global variables. Objects that become unreachable during execution are called garbage and need to be collected and freed to make room for other live objects.

A number of garbage collection algorithms exist. Examples include generational collection, reference counting collection, mark and sweep collection, copy collection, and tracing collection. Variations of these algorithms may be used. For example, in the Java™ HotSpot™ VM, the garbage collection algorithms include a multithreaded synchronous copying collector and a mostly concurrent asynchronous non-copying mark and sweep collector.

A GC (or any other VM task) cycle that is not expected to create significant flushing of cache data or that is determined to benefit from executing within a particular cluster of processors may be affinitized to a cluster of processors that is most appropriate for the task. This may include those clusters that are selected by the application exclusive group 310 if the run-time system is in a compatible state as illustrated in FIG. 3. On the other hand, if the GC (or any other VM task) cycle has a usage status indicating that it should be assigned to a cluster of processors having a set of caches (i.e., set of L1, L2, and TLC) independent and/or separate from those sets of caches of other application threads, then it may be affinitized to the VM exclusive group 330. In this way, the sets of other caches used by the application threads can be preserved and are not interfered, flushed, or polluted by the GC thread.

In general, the technique is applied to any type of thread, including application threads, and not just the GC thread. The main consideration is the thread usage of local memories. Local memories here refer to the L1, L2 and TLC caches. It is contemplated that cache coherence is maintained across the system using any suitable cache coherence protocol for multiprocessor systems.

Figure 5:
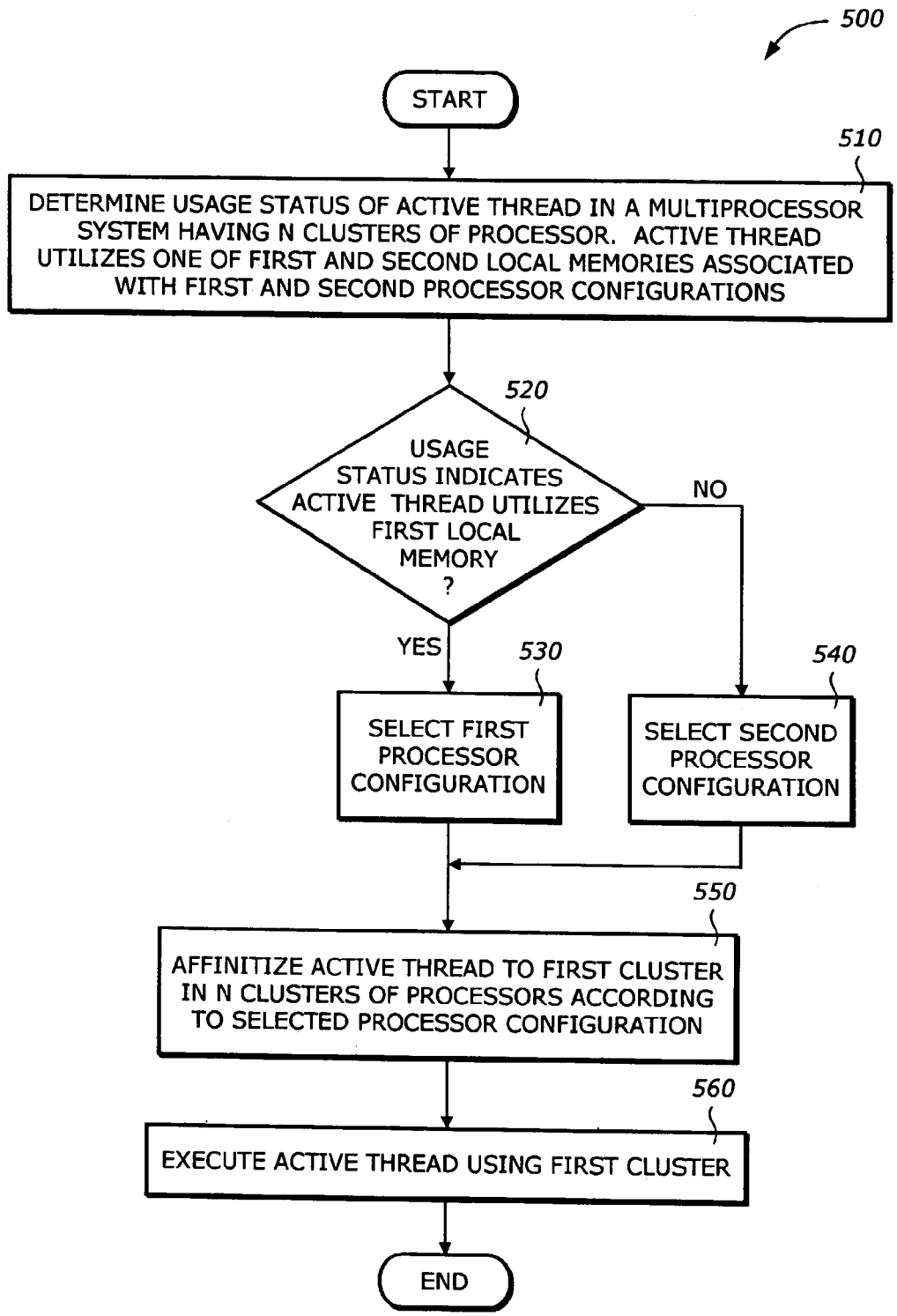
FIG. 5 is a flowchart illustrating a process to affinitize a thread based on thread usage status according to one embodiment of the invention.

FIG. 5 is a flowchart illustrating a process 500 to affinitize a thread based on thread usage status according to one embodiment of the invention.

Upon START, the process 500 determines the usage status of the active thread in the multiprocessor system having N clusters of processors (Block 510). The active thread utilizes one of first and second local memories associated with first and second processor configurations, respectively. One of the local memories is associated with an available cluster of processors in one processor configuration that is not assigned to the other processor configuration.

Next, the process 500 determines if the usage status indicates that the processor utilizes the first local memory (Block 520). This can be performed by determining the task and the extent or scope of this task. For example, an active thread performing garbage collection may involve a minor or a major collection. If the usage status indicates that the active thread utilizes the first local memory, then the process 500 selects the first processor configuration (Block 530). Otherwise, the process 500 selects the second processor configuration (Block 540).

Then, the process 500 affinitizes the active thread to a first cluster of processors as determined by the granularity mask that is used to provide the corresponding processor configuration (Block 550). Next, the process 500 executes the active thread using the selected first cluster (Block 560) and is then terminated.

Figure 6:
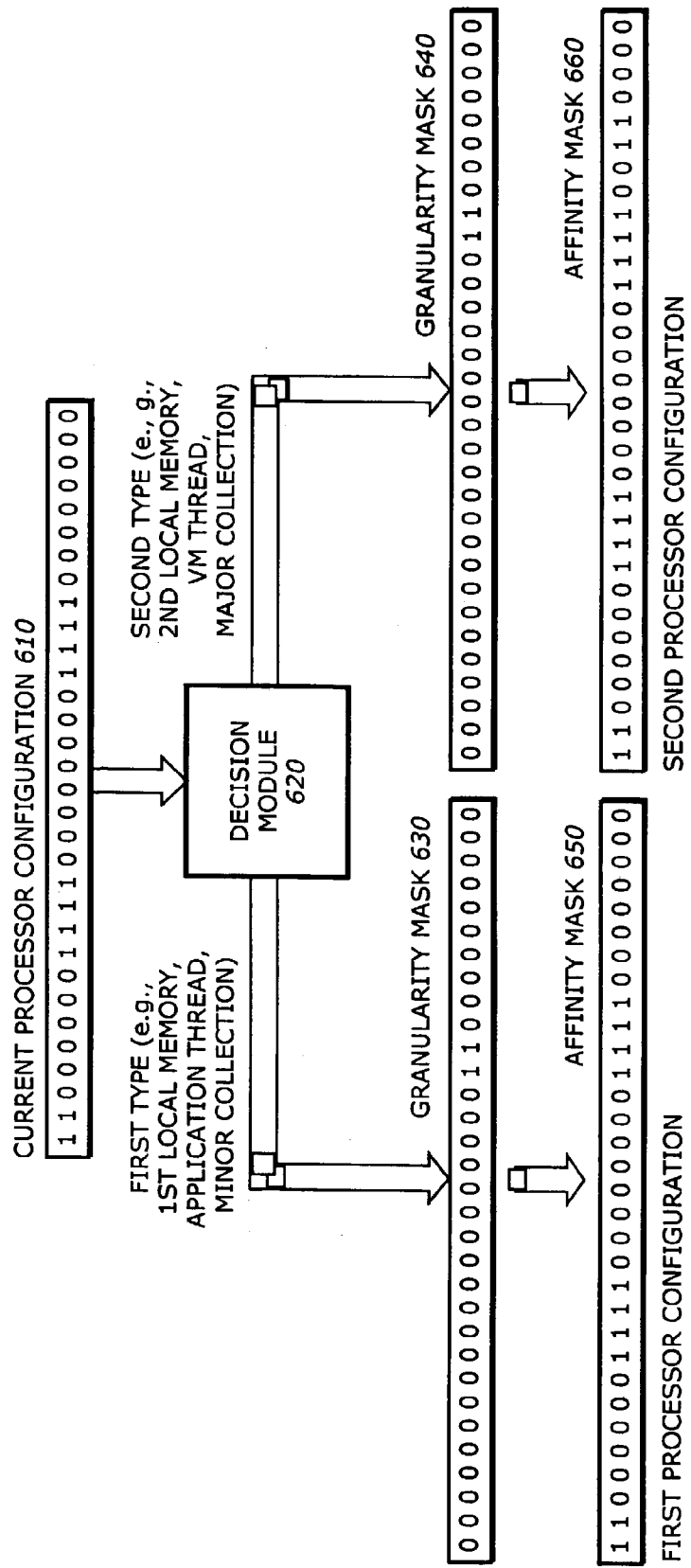
FIG. 6 is a diagram illustrating creating first and second affinity masks according to one embodiment of the invention.

FIG. 6 is a diagram illustrating creating first and second affinity masks according to one embodiment of the invention. The example shows a current affinity mask 610, a decision module 620, first and second granularity masks 650 and 660, first and second affinity masks 670 and 680. As discussed above, the current, first, and second affinity masks 610, 670, and 680 correspond to the current, first, and second processor configurations.

The decision module 620 determines the usage status of the active thread and classifies into two types. This decision module 620 is essentially equivalent to the decision block 520 in FIG. 5. The usage status may be classified or queried or determined based on the type or task that the active thread is to perform. For example, the usage status may indicate if the active thread is an application thread or a VM thread. The decision module 620 may also determine if the active thread utilizes the first or second local memories associated with the first or second processor configurations. If the active thread is a garbage collection thread in the VM, the decision module 620 may determine if the garbage collection is a minor collection or a major collection. Depending on the usage status, the first or second affinity mask 650 or 660 is created. It is contemplated that more than two types of thread can be categorized and the number of groups in the granularity masks may also be any number. The decision module 620 branches to appropriate branch to perform the required operation.

In the illustrative example shown in FIG. 6, the current affinity mask 610 is 1100 0000 1111 0000 0000 1111 0000 0000. The first and second granularity masks 630 and 640 are 0000 0000 0000 0000 0000 1100 0000 0000 and 0000 0000 0000 0000 0000 0011 0000 0000. The resulting first and second affinity masks 650 and 660 are 1100 0000 1111 0000 0000 1111 0000 0000 and 1100 0000 1111 0000 0000 1111 0011 0000, as the result of the bitwise OR operation between the masks 610 and 630, and 610 and 640, respectively.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    determining a usage status of an active thread in a multiprocessor system having N clusters of processors, the usage status indicating a thread type of the active thread, the thread type being one of an application thread and a virtual machine (VM) thread, the active thread utilizing one of first and second local memories associated with first and second processor configurations, respectively; and
    selecting one of the first and second processor configurations based on the usage status;
    wherein determining the usage status comprises:
        determining the thread type of the active thread being one of the application thread in an application and an internal virtual machine (VM) thread in a virtual machine (VM), the application and the virtual machine using the first and second processor configurations, respectively, the second processor configuration having at least an available cluster of processors not assigned to the application.

2. The method of claim 1 further comprising:
    affinitizing the active thread to a first cluster in the N clusters of processors according to the selected one of the first and second processor configurations.

3. The method of claim 2 further comprising:
    executing the active thread using the first cluster.

4. The method of claim 2 wherein selecting comprises:
    selecting the first processor configuration if the usage status indicates the active thread utilizes the first local memory; and selecting the second processor configuration if the usage status indicates the active thread utilizes the second local memory.

5. The method of claim 4 wherein selecting the first processor configuration comprises:
creating a first affinity mask to correspond to the first processor configuration.

6. The method of claim 5 wherein creating a first affinity mask comprises:
obtaining a first granularity mask to correspond to a first cluster having the first local memory; and
combining the first granularity mask with a current affinity mask to provide the first affinity mask.

7. The method of claim 5 wherein affinitizing comprises:
affinitizing the active thread to the first cluster in the N clusters of processors using the first affinity mask.

8. The method of claim 4 wherein selecting the second processor configuration comprises:
creating a second affinity mask to correspond to the second processor configuration.

9. The method of claim 8 wherein creating a second affinity mask comprises:
obtaining a second granularity mask to correspond to a first cluster having the second local memory; and
combining the second granularity mask with a current affinity mask to provide the second affinity mask.

10. The method of claim 8 wherein affinitizing comprises:
affinitizing the active thread to the first cluster in the N clusters of processors using the second affinity mask.

11. The method of claim 1 wherein determining the thread type comprises:
determining the thread type of the active thread in the VM being a garbage collection thread.

12. The method of claim 1 wherein determining the thread type comprises:
determining the thread type of the active thread in the VM being a garbage collection thread, the garbage collection thread performing garbage collection using one of a generational collection, reference counting collection, mark and sweep collection, copy collection, and tracing collection.

13. The method of claim 12 wherein selecting comprises:
selecting the first processor configuration if the usage status indicates the active thread performs a minor garbage collection; and
selecting the second processor configuration if the usage status indicates the active thread performs a major garbage collection.

14. The method of claim 1 wherein determining the usage status comprises:
determining the usage status of the active thread in a multiprocessor system having N clusters of processors, the multiprocessor system being a cellular multiprocessor (CMP) system.

15. The method of claim 14 wherein determining the usage status comprises:
determining the usage status of the active thread in the CMP system having a configurable thread granularity.

16. The method of claim 15 wherein determining the usage status of the active thread comprises:
determining the usage status of the active thread in the CMP system having a configurable thread granularity, the configurable thread granularity being one of a processor granularity, a bus granularity, a subpod granularity, and a pod granularity.

17. The method of claim 1 wherein determining the usage status comprises:
determining the thread type of the active thread being one of the application thread in a Java™ application and an internal virtual machine (VM) thread in a virtual machine (VM), the Java™ application and the virtual machine using the first and second processor configurations, respectively.

18. The method of claim 1 wherein determining the usage status comprises:
determining the usage status of the active thread, the active thread being one of the application thread in an application and an internal Java™ virtual machine (VM) thread in a Java™ virtual machine (JVM), the application and the JVM using the first and second processor configurations, respectively.

19. An article of manufacture comprising:
a machine-accessible storage medium including data that, when accessed by a machine, causes the machine to perform operations comprising:
determining a usage status of an active thread in a multiprocessor system having N clusters of processors, the usage status indicating a thread type of the active thread, the thread type being one of an application thread and a virtual machine (VM) thread, the active thread utilizing one of first and second local memories associated with first and second processor configurations, respectively; and
selecting one of the first and second processor configurations based on the usage status;
wherein the data causing the machine to perform determining the usage status comprises data that, when accessed by the machine, causing the machine to perform operations comprising:
determining the thread type of the active thread being one of the application thread in an application and an internal virtual machine (VM) thread in a virtual machine (VM), the application and the virtual machine using the first and second processor configurations, respectively, the second processor configuration having at least an available cluster of processors not assigned to the application.

20. The article of manufacture of claim 19 wherein the data further comprising data that, when accessed by the machine, causes the machine to perform operations comprising:
affinitizing the active thread to a first cluster in the N clusters of processors according to the selected one of the first and second processor configurations.

21. The article of manufacture of claim 20 wherein the data further comprising data that, when accessed by the machine, causes the machine to perform operations comprising:
executing the active thread using the first cluster.

22. The article of manufacture of claim 20 wherein the data causing the machine to perform selecting comprises data that, when accessed by the machine, causes the machine to perform operations comprising:
selecting the first processor configuration if the usage status indicates the active thread utilizes the first local memory; and
selecting the second processor configuration if the usage status indicates the active thread utilizes the second local memory.

23. The article of manufacture of claim 22 wherein the data causing the machine to perform selecting the first processor configuration comprises data that, when accessed by the machine, causes the machine to perform operations comprising:

creating a first affinity mask to correspond to the first processor configuration.

24. The article of manufacture of claim 23 wherein the data causing the machine to perform creating a first affinity mask the first processor configuration comprises data that, when accessed by the machine, causes the machine to perform operations comprising:
   obtaining a first granularity mask to correspond to a first cluster having the first local memory; and
   combining the first granularity mask with a current affinity mask to provide the first affinity mask.

25. The article of manufacture of claim 23 wherein the data causing the machine to perform affinitizing the first processor configuration comprises data that, when accessed by the machine, causes the machine to perform operations comprising:
   affinitizing the active thread to the first cluster in the N clusters of processors using the first affinity mask.

26. The article of manufacture of claim 22 wherein the data causing the machine to perform selecting the second processor configuration comprises data that, when accessed by the machine, causes the machine to perform operations comprising:
   creating a second affinity mask to correspond to the second processor configuration.

27. The article of manufacture of claim 26 wherein the data causing the machine to perform creating a second affinity mask comprises data that, when accessed by the machine, causes the machine to perform operations comprising:
   obtaining a second granularity mask to correspond to a first cluster having the second local memory; and
   combining the second granularity mask with a current affinity mask to provide the second affinity mask.

28. The article of manufacture of claim 26 wherein the data causing the machine to perform affinitizing the first processor configuration comprises data that, when accessed by the machine, causes the machine to perform operations comprising:
   affinitizing the active thread to the first cluster in the N clusters of processors using the second affinity mask.

29. The article of manufacture of claim 19 wherein the data causing the machine to perform determining the thread type comprises data that, when accessed by the machine, causes the machine to perform operations comprising:
   determining the thread type of the active thread in the VM being a garbage collection thread.

30. The article of manufacture of claim 19 wherein the data causing the machine to perform determining the thread type comprises data that, when accessed by the machine, causes the machine to perform operations comprising:
   determining the thread type of the active thread in the VM being a garbage collection thread, the garbage collection thread performing garbage collection using one of a generational collection, reference counting collection, mark and sweep collection, copy collection, and tracing collection.

31. The article of manufacture of claim 30 wherein the data causing the machine to perform selecting comprises data that, when accessed by the machine, causes the machine to perform operations comprising:
   selecting the first processor configuration if the usage status indicates the active thread performs a minor garbage collection; and
   selecting the second processor configuration if the usage status indicates the active thread performs a major garbage collection.

32. The article of manufacture of claim 19 wherein the data causing the machine to perform determining the usage status comprises data that, when accessed by the machine, causes the machine to perform operations comprising:
   determining the usage status of the active thread in a multiprocessor system having N clusters of processors, the multiprocessor system being a cellular multiprocessor (CMP) system.

33. The article of manufacture of claim 32 wherein the data causing the machine to perform determining the usage status comprises data that, when accessed by the machine, causes the machine to perform operations comprising:
   determining the usage status of the active thread in the CMP system having a configurable thread granularity.

34. The article of manufacture of claim 33 wherein the data causing the machine to perform determining the usage status of the active thread comprises data that, when accessed by the machine, causes the machine to perform operations comprising:
   determining the usage status of the active thread in the CMP system having a configurable thread granularity, the configurable thread granularity being one of a processor granularity, a bus granularity, a subpod granularity, and a pod granularity.

35. The article of manufacture of claim 19 wherein the data causing the machine to perform determining the usage status comprises data that, when accessed by the machine, causes the machine to perform operations comprising:
   determining the thread type of the active thread being one of the application thread in a Java™ application and an internal virtual machine (VM) thread in a virtual machine (VM), the Java™ application and the virtual machine using the first and second processor configurations, respectively.

36. The article of manufacture of claim 19 wherein the data causing the machine to perform determining the usage status comprises data that, when accessed by the machine, causes the machine to perform operations comprising:
   determining the thread type of the active thread being one of the application thread in an application and an internal Java™ virtual machine (VM) thread in a Java™ virtual machine (JVM), the application and the JVM using the first and second processor configurations, respectively.

37. A system comprising:
   N clusters of processors; and
   a memory coupled to a processor in the N clusters of processors, the memory containing program code that, when executed by the processor, causes the processor to:
      determine a usage status of an active thread in a multiprocessor system having N clusters of processors, the usage status indicating a thread type of the active thread, the thread type being one of an application thread and a virtual machine (VM) thread, the active thread utilizing one of first and second local memories associated with first and second processor configurations, respectively, and
      select one of the first and second processor configurations based on the usage status;
   wherein the program code causing the processor to determine the usage status causes the processor to:
      determine the thread type of the active thread being one of the application thread in an application and an internal virtual machine (VM) thread in a virtual machine (VM), the application and the virtual machine using the first and second processor configurations, respectively, the second processor configuration having at least an available cluster of processors not assigned to the application.

38. The system of claim 37 wherein the program code further causes the processor to:
 affinitize the active thread to a first cluster in the N clusters of processors according to the selected one of the first and second processor configurations.

39. The system of claim 38 wherein the program code further causes the processor to:
 execute the active thread using the first cluster.

40. The system of claim 38 wherein the program code causing the processor to select causes the processor to:
 select the first processor configuration if the usage status indicates the active thread utilizes the first local memory; and
 select the second processor configuration if the usage status indicates the active thread utilizes the second local memory.

41. The system of claim 40 wherein the program code causing the processor to select the first processor configuration causes the processor to:
 create a first affinity mask to correspond to the first processor configuration.

42. The system of claim 41 wherein the program code causing the processor to create a first affinity mask causes the processor to:
 obtain a first granularity mask to correspond to a first cluster having the first local memory; and
 combine the first granularity mask with a current affinity mask to provide the first affinity mask.

43. The system of claim 41 wherein the program code causing the processor to affinitize causes the processor to:
 affinitize the active thread to the first cluster in the N clusters of processors using the first affinity mask.

44. The system of claim 40 wherein the program code causing the processor to select the second processor configuration causes the processor to:
 create a second affinity mask to correspond to the second processor configuration.

45. The system of claim 44 wherein the program code causing the processor to create a second affinity mask causes the processor to:
 obtain a second granularity mask to correspond to a first cluster having the second local memory; and
 combine the second granularity mask with a current affinity mask to provide the second affinity mask.

46. The system of claim 44 wherein the program code causing the processor to affinitize causes the processor to:
 affinitize the active thread to the first cluster in the N clusters of processors using the second affinity mask.

47. The system of claim 37 wherein the program code causing the processor to determine the thread type comprises causes the processor to:
 determine the thread type of the active thread in the VM being a garbage collection thread.

48. The system of claim 37 wherein the program code causing the processor to determine the thread type causes the processor to:
 determine the thread type of the active thread in the VM being a garbage collection thread, the garbage collection thread performing garbage collection using one of a generational collection, reference counting collection, mark and sweep collection, copy collection, and tracing collection.

49. The system of claim 48 wherein the program code causing the processor to select comprises causes the processor to:
 select the first processor configuration if the usage status indicates the active thread performs a minor garbage collection; and
 select the second processor configuration if the usage status indicates the active thread performs a major garbage collection.

50. The system of claim 37 wherein the program code causing the processor to determine the usage status comprises causes the processor to:
 determine the usage status of the active thread in a multiprocessor system having N clusters of processors, the multiprocessor system being a cellular multiprocessor (CMP) system.

51. The system of claim 50 wherein the program code causing the processor to determine the usage status causes the processor to:
 determine the usage status of the active thread in the CMP system having a configurable thread granularity.

52. The system of claim 51 wherein the program code causing the processor to determine the usage status of the active thread causes the processor to:
 determine the usage status of the active thread in the CMP system having a configurable thread granularity, the configurable thread granularity being one of a processor granularity, a bus granularity, a subpod granularity, and a pod granularity.

53. The system of claim 37 wherein the program code causing the processor to determine the usage status comprises causes the processor to:
 determine the thread type of the active thread being one of the application thread in a Java™ application and an internal virtual machine (VM) thread in a virtual machine (VM), the Java™ application and the virtual machine using the first and second processor configurations, respectively.

54. The system of claim 37 wherein the program code causing the processor to determine the usage status causes the processor to:
 determine the thread type of the active thread being one of the application thread in an application and an internal Java™ virtual machine (VM) thread in a Java™ virtual machine (JVM), the application and the JVM using the first and second processor configurations, respectively.

* * * * *